(12) United States Patent
Shimada et al.

(10) Patent No.: US 11,588,632 B2
(45) Date of Patent: Feb. 21, 2023

(54) PRIVATE KEY CREATION USING LOCATION DATA

(71) Applicant: INTERNATIONAL BUSINESS MACHINES CORPORATION, Armonk, NY (US)

(72) Inventors: Junichi Shimada, Tokyo (JP); Shuichi Hachiya, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 184 days.

(21) Appl. No.: 17/028,573

(22) Filed: Sep. 22, 2020

(65) Prior Publication Data
US 2022/0094537 A1   Mar. 24, 2022

(51) Int. Cl.
| | | |
|---|---|---|
| *H04L 9/08* | (2006.01) | |
| *G06F 7/58* | (2006.01) | |
| *H04L 9/32* | (2006.01) | |

(52) U.S. Cl.
CPC ............ *H04L 9/0872* (2013.01); *G06F 7/582* (2013.01); *H04L 9/0869* (2013.01); *H04L 9/0877* (2013.01); *H04L 9/3247* (2013.01); *H04L 2209/12* (2013.01)

(58) Field of Classification Search
CPC ... H04L 9/0872; H04L 9/0869; H04L 9/0877; H04L 9/3247; H04L 2209/12; H04L 9/0897; H04L 9/3239; H04L 9/50; G06F 7/582; G06F 21/602; G06Q 20/3829; H04W 4/02
See application file for complete search history.

(56) References Cited

U.S. PATENT DOCUMENTS 7,360,248 B1 * 4/2008 Kanevsky ............... G06F 21/34
                                                        726/21
10,148,668 B2   12/2018 Bandi
(Continued)

FOREIGN PATENT DOCUMENTS

| JP | 2008172282 A1 | 7/2008 |
|---|---|---|
| WO | 2020110079 A1 | 6/2020 |

OTHER PUBLICATIONS

International Search Report and Written Opinion, PCT/EP2021/075366, dated Dec. 22, 2021.
(Continued)

*Primary Examiner* — Matthew Smithers
(74) *Attorney, Agent, or Firm* — Nathan M. Rau

(57) ABSTRACT

Methods and a system of generating a master seed using location-based data. The system includes a pseudo-random number generator configured to generate a random number and a global positioning system module configured to determine a location of the system. The system also includes an encryption module configured to generate a signing request message. The signing request message includes the random number and the location. The system further includes a communication device configured to transmit the signing request message to a location authority for authorization. The communication device further configured to receive a signature from the location authority upon authorization of the signing request message. The system is further configured to generate a master seed based on the signature.

17 Claims, 8 Drawing Sheets

(56) References Cited

U.S. PATENT DOCUMENTS

| | | | | |
|---|---|---|---|---|
| 2007/0086593 | A1* | 4/2007 | Denning | H04L 63/0428 |
| | | | | 380/286 |
| 2009/0316900 | A1 | 12/2009 | Qiu | |
| 2010/0278335 | A1 | 11/2010 | Enge | |
| 2011/0185177 | A1* | 7/2011 | Spalka | H04L 9/3247 |
| | | | | 713/171 |
| 2012/0102334 | A1* | 4/2012 | O'Loughlin | H04L 9/0877 |
| | | | | 713/189 |
| 2012/0159156 | A1* | 6/2012 | Barham | G06F 21/604 |
| | | | | 726/4 |
| 2014/0181504 | A1* | 6/2014 | Almahallawy | H04L 63/0823 |
| | | | | 713/156 |
| 2016/0261408 | A1* | 9/2016 | Peddada | H04L 9/0861 |
| 2017/0070485 | A1 | 3/2017 | Kumar | |
| 2017/0353435 | A1* | 12/2017 | Pritikin | H04W 4/02 |
| 2019/0349204 | A1* | 11/2019 | Enke | G06F 21/602 |
| 2020/0153625 | A1 | 5/2020 | Schaap | |
| 2020/0226586 | A1* | 7/2020 | Lu | G06Q 20/3825 |
| 2020/0272745 | A1* | 8/2020 | Bott | H04L 9/0897 |
| 2021/0044575 | A1* | 2/2021 | Kong | H04L 9/3268 |
| 2021/0314171 | A1* | 10/2021 | Choyi | H04L 63/0823 |

OTHER PUBLICATIONS

"PBKDF2," Wikipedia, Printed Jun. 4, 2020, 3 pages, https://en.wikipedia.org/wiki/PBKDF2.

Cryptosteel —"Mother of all Backups—Secure your wallet seed phrase," https://cryptosteel.com.

Gilman et al., Abstract—"Zero Trust Networks: Building Secure Systems in Untrusted Networks," http://shop.oreilly.com/product/0636920052265.do.

Ledger Nano, https://www.ledger.com, Printed: Jun. 4, 2020, 8 pages.

Marek Palatinus, et al, "Mnemonic code for generating deterministic keys," Created Sep. 10, 2013, https://github.com/bitcoin/bips/blob/master/bip-0039.mediawiki.

Peter Wuille, "Hierarchical Deterministic Wallets," printed Sep. 23, 2020, 14 pages, https://github.com/bitcoin/bips/blob/master/bip-0032.mediawiki.

Scott et al., "A Location Based Encryption Technique and Some of Its Applications," Article, ION NTM 2003, Jan. 2003, pp. 734-740.

Shamir Backup, Trezor Wiki, Printed Jun. 4, 2020, 3 pages, https://wiki.trezor.io/Shamir_Backup.

Tiware et al., "Geo-Encryption A Revolutionary Information Security Mechanism," International Journal of Innovative Research in Science, Engineering and Technology, vol. 7, Issue 2, Feb. 2018, pp. 1502-1507.

Yua, "An exploration of BIP39,"—Translated and printed on Sep. 23, 2020, 12 pages, https://tech.bitbank.cc/about-bip39/.

How to calculate hash of salted password by SHA256 and PBKDF2 by C #, csharp.keicode.com, https://csharp.keicode.com/topics/salt-and-hash-1.php. Retrieved from the internet on Jan. 6, 2022.

* cited by examiner

PRIVATE KEY CREATION USING LOCATION DATA

BACKGROUND

The present disclosure relates to private encryption key creation, and more specifically, to master seed creation on a hardware security module using a predetermined location authorized by a location authority.

In public-key cryptography, there are two keys: one to encrypt and another to decrypt. The encryption key is called a public key and is generally considered publicly available to any party wanting to send encrypted messages to a receiving party. The decryption key, used to decrypt the encrypted message, is called a private key and is typically not shared between parties.

A digital signature is a mathematical scheme for verifying the authenticity of digital messages or documents using public-key cryptography. Digital signatures can prove that the holder of a private key tied to a particular digital signature signed some message and that the signature is authentic. A valid digital signature, where the prerequisites are satisfied, gives a receiving party assurance that the message was created the sending party and that the message was not altered during transmission.

SUMMARY

Embodiments of the present disclosure are directed to a location-based hardware security module that creates a master seed using location, including at least one processor and at least one memory component. The location-based hardware security module also includes a pseudo-random number generator (PRNG) configured to generate a random number and a global positioning system (GPS) module configured to determine a location of the location-based HSM. The location-based hardware security module also includes an encryption module configured to generate a signing request message. The signing request message includes the random number and the location. The location-based hardware security module further includes a communication device configured to transmit the signing request message to a location authority for authorization. The communication device is further configured to receive a signature from the location authority upon authorization of the signing request message. The encryption module is further configured to generate a master seed based on the signature.

Additional embodiments are directed to a computer-implemented method of creating a master seed using location data. The computer-implemented method includes creating a signing request message using a location-based HSM located at a location. The computer-implemented method also includes transmitting the signing request message to a location authority with coordinates of the location attached. The location authority is physically located at a geographically assured location, and the location is within an authorization zone of the location authority. The computer-implemented method further includes receiving a response from the location authority authorizing the signing request message based on the coordinates and providing a signature. The computer-implemented method also includes creating a master seed based on the signature.

Further embodiments are directed to a computer program product of creating a master seed using location data, which can include one or more computer-readable storage medium, and program instructions stored on the one or more computer-readable storage media. The program instructions include program instructions to create a signing request message using a location-based HSM located at a location. The program instructions also include program instructions to transmit the signing request message to a location authority with coordinates of the location attached. The location authority is physically located at a geographically assured location, and the predetermined location is within an authorization zone of the location authority. The program instructions further include program instructions to receive a response from the location authority authorizing the signing request message based on the coordinates and providing a signature. The program instructions also include program instructions to create a master seed based on the signature.

BRIEF DESCRIPTION OF THE DRAWINGS

These and other features, aspects, and advantages of the embodiments of the disclosure will become better understood with regard to the following description, appended claims, and accompanying drawings where:

Figure 1:
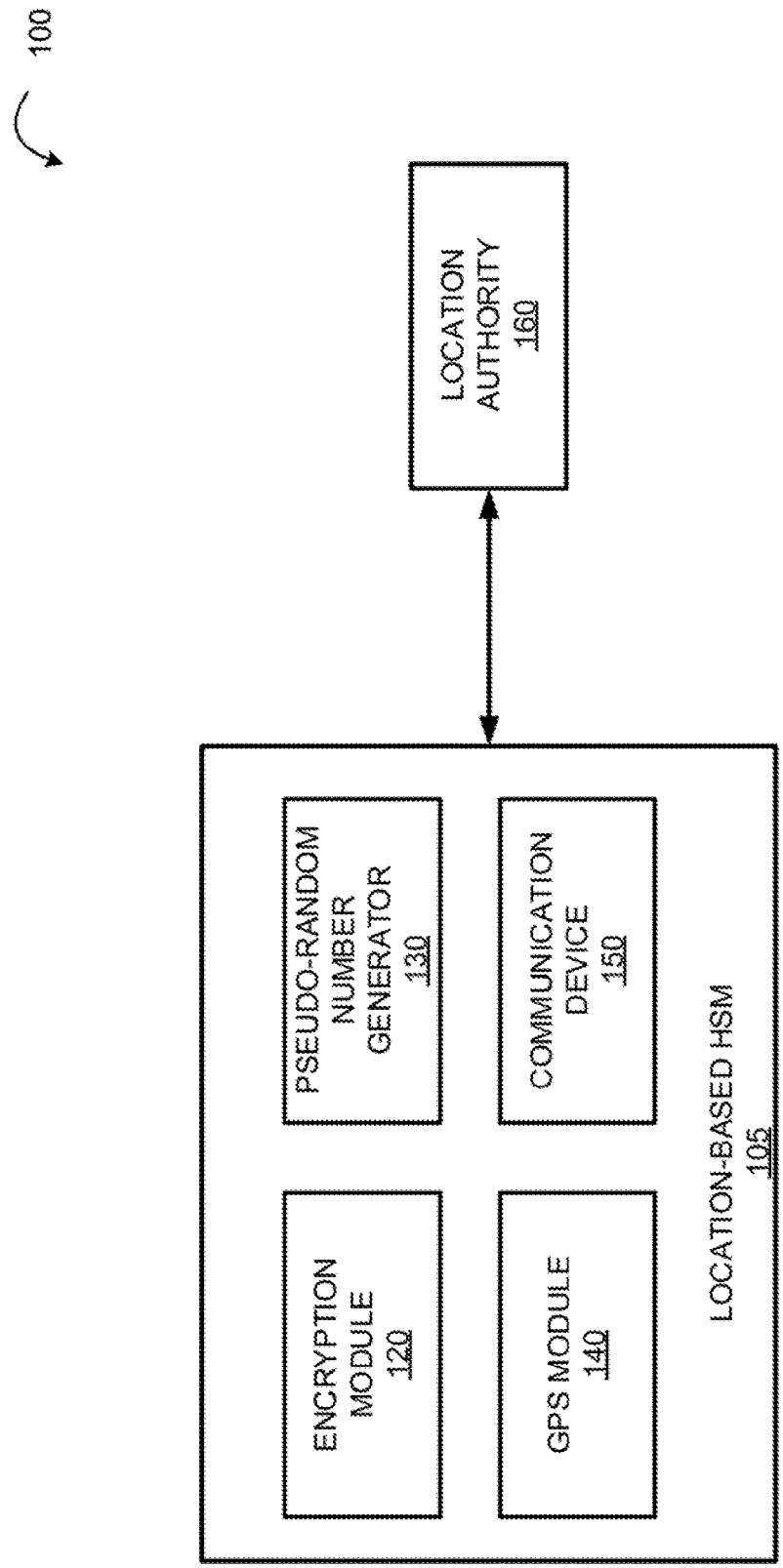
FIG. 1 is a block diagram illustrating an infrastructure discovery system in a computing environment, in accordance with embodiments of the present disclosure.

While the present disclosure is amenable to various modifications and alternative forms, specifics thereof have been shown by way of example, in the drawings and will be described in detail. It should be understood, however, that the intention is not to limit the particular embodiments described. On the contrary, the intention is to cover all modifications, equivalents, and alternatives falling within the scope of the present disclosure. Like reference numerals are used to designate like parts in the accompanying drawings.

DETAILED DESCRIPTION

The present disclosure relates to private encryption key creation, and more specifically, to master seed creation on a hardware security module using a predetermined location authorized by a location authority. While the present disclosure is not necessarily limited to such applications, various aspects of the disclosure may be appreciated through a discussion of various examples using this context.

Hardware security modules are physical computing devices that can safeguard and manage digital keys, perform encryption and decryption functions for digital signatures, perform authentication, as well as other cryptographic functions. Typically, hardware security modules come in the form of a plug-in card or an external device that attaches directly to a computer or network server.

A hardware security module can have features that provide tamper evidence such as visible signs of tampering or logging. Additionally, tamper resistance mechanisms can make tampering difficult without making the hardware security module inoperable. Hardware security modules are designed to manage secret keys that can be used in the authorization and authentication of a user.

Typical functions of a hardware security module include, for example, onboard secure cryptographic key generation, secure cryptographic key storage, key management, and performing encryption or digital signature functions. Hardware security modules can support symmetric and asymmetric cryptography. For some applications, such as certificate authorization and digital signing, public-key cryptography is used by the hardware security module.

Cryptocurrencies, such as a bitcoin, can use hardware security modules as hardware wallets or personal security devices, designed to isolate cryptographic secrets (e.g., bitcoin private keys) from potentially insecure devices (e.g., personal computer). These devices allow a person to securely perform operations using private keys stored on the device.

In some hardware security modules, a hierarchical deterministic key generation process is used to derive cryptographic secrets (e.g., private keys) from a single master seed. This allows for private keys to be generated on-demand by the hardware security module from the master seed.

A common method of creating/recovering a wallet for bitcoin is bitcoin improvement proposal (BIP) 0039, hereinafter BIP39. BIP39 describes the implementation of a mnemonic code or mnemonic sentence for the generation of deterministic wallets. It consists of generating the mnemonic and then converting the mnemonic into a master seed. The mnemonic word can be a twelve to twenty-four-word mnemonic.

Limitations on security remain, however, on recovering master seeds using hardware security modules. When using conventional recovery techniques, such as BIP39, if the recovery mnemonic sentence is revealed or leaked, the hardware security module becomes completely compromised. This can prevent a user from accessing their sensitive information, such as their cryptocurrency, or potentially allowing the sensitive information to be stolen.

Embodiments of the present disclosure may overcome the above and other problems by using a location-based hardware security module (HSM). The location-based HSM can generate a master seed using a predetermined location that is authorized by a location authority. The predetermined location is an undisclosed location known only by a user operating the location-based HSM. Additionally, to regenerate the master seed, a twenty-four-word mnemonic in conjunction with the predetermined location is used in the process. The master seed generation can also only occur within an authorization zone of a location authority based on a location. For example, if the location is a location within the authorization zone of the location authority, then the location authority can authorize the signing request message. However, if the predetermined location is outside the authorization zone, then the signing request message is not authorized and unable to be used on the location-based HSM.

More specifically, the location-based HSM generates a master seed by creating a signing request message while physically located at a location. The location-based HSM can acquire the coordinates of the location via a global positioning system (GPS) module located within the HSM. Once the signing request is generated, the location-based HSM can transmit the signing request to an appropriate location authority for authorization. If the coordinates of the location are within an authorization zone of the location authority, location-based HSM will receive a response back from the location authority, providing authorization of the signing request message. The location-based HSM then generates a master seed based on the authorized signing request message.

In some embodiments, the location-based HSM creates the signing request message by acquiring the location data of the location via the GPS module. The location-based HSM can determine whether the location data matches the predetermined location using the GPS coordinates of the location data. The longitudinal and latitudinal values of the location can be extracted, and a random number can be generated by the location-based HSM. Using those values, the signing request message can be generated. In some embodiments, the random number is generated with a pseudo-random number generator using a current time of the location-based HSM as an entropy value.

In some embodiments, the location data is retrieved via a map application. For example, an operator of the location-based HSM can select the predetermined location on a map application. The coordinates of the location can then be used in creating the signing request message. In some embodiments, multiple predetermined locations are selected as the location data via a map application. For example, an operator can select the four location in the map application, the coordinates of those four locations can then be added to the signing request message. Additionally, the order in which the locations are selected can also be added. Each of the locations selected can then be verified by a location authority as well as the order of selection. When recreating a master seed, each of the locations must be verified as well as the order in which the locations are selected.

Referring now to the figures, FIG. 1 is a block diagram illustrating an authorization environment 100, in accordance with embodiments of the present disclosure. The authorization environment 100 includes a location-based HSM 105 and a location authority 160. The location-based HSM 105 includes an encryption module 120, a pseudo-random number generator (PRNG) 130, a GPS module 140, and a communication device 150.

The location-based HSM 105 is a component of the authorization environment 100 configured to generate and store a master seed using its location. In some embodiments, the location-based HSM 105 is a personal security device. The personal security device can be used to generate the master seed and maintain its isolation from insecure devices. The master seed is a key that can derive other cryptographic secrets, such as private keys, that can be used for cryptographic purposes, such as digital signatures and authorization.

The encryption module 120 is a component of the location-based HSM 105 configured to perform cryptographic functions that create the master seed. The encryption module 120 can generate a signing request using the secure hash algorithm 2 (SHA-2). SHA-2 is a set of six hash function with digest (hash values) that are 224, 256, 384, or 512 bits (SHA-224, SHA-256, SHA-384, SHA-512). These functions can perform computations with 32-bit and 64-bit words. Additionally, they can use different shift amounts and additive constants (e.g., location data) when performing the computation.

In some embodiments, the encryption module 120 generates the signing request by applying the SHA-256 function using a random number generated by the PRNG 130 and the location data detected by the GPS module 140. This is illustrated using equation 1, defined below:

$$SRM=sha256(ENT)+LD \qquad \text{Equation 1}$$

where SRM represents the signing request message, sha256 represents the SHA-256 cryptographic hash function from the SHA-2 set of functions, ENT represents the random number used as an entropy value, and LD represents the location data of the location-based HSM 105 at the time of generation.

The encryption module 120 is further configured to generate the master seed using a signature provided by the location authority 160. In some embodiments, the encryption module 120 creates the master seed using a key derivation function. A key derivation function is a cryptographic hash function that derives one or more secret keys from a secret value such as a master key. The key derivation function can be, for example, a password-based key derivation function 2 (PBKDF1), PBKDF2, or Argon2.

The encryption module is further configured to generate a checksum and a mnemonic sentence. The checksum can be generated by applying a SHA-2 function to the signature. The first 8-bits of that function can represent the checksum. A mnemonic sentence can also be generated by dividing the random number added to the checksum into 11-bit units. In some embodiments, each of the 11-bit units are given a word from the BIP39 word list.

The encryption module 120 is further configured to verify the signature received by the location authority 160. The encryption module 120 can utilize a public key available for the location authority 160 to run a verification algorithm to ensure the validity of the location authority 160.

The encryption module 120 is further configured to restore the master seed using the mnemonic sentence. In some embodiments, the mnemonic sentence is received by the location-based HSM 105. Once received, the encryption module 120 can separate a random number and the checksum from the mnemonic sentence to create a new signing request message with the current location data attached.

In some embodiments, to restore the master seed, nine signing request messages are created using the information described directly above but also with eight other signing messages with location data incremented or decremented by 1 to generated areas surrounding the location data. The location authority can verify each location data and can perform a signing operation on each of the signing request messages.

The PRNG 130 is a component of the location-based HSM 105 configured to generate random numbers. Cryptosystems, such as location-based HSM 105 utilize the PRNG 130 as a source of uncertainty, or source of entropy, within the system. The PRNG 130 uses cryptographic algorithms to produce random bits from a source of randomness. Randomness can come from the environment, which is analog, uncertain, and unpredictable. In some embodiments, the PRNG 130 uses an RNG, which are software or hardware components that leverage entropy in analog mechanisms to produce unpredictable bits in a digital system. For example, an RNG may directly sample bits from measurements of temperature, acoustic noise, air turbulence, or electrical static.

In some embodiments, the PRNG 130 derives the entropy from the current time the location-based HSM 105 generates a signing request message. For example, the location-based HSM 105 initiates a master seed generation at 6:05 PM. The PRNG 130 can then use the time of 6:05 PM as entropy when generating a random number. While shown as a time down to the minute, other times increments may be used. For example, a time down to the hour, second, or millisecond can also be used.

The PRNG 130 can receive random bits from an RNG at regular intervals and use those bits to update the contents of an entropy pool. The PRNG 130 can run a deterministic random bit generator algorithm that expands some bits from the entropy pool into a longer sequence to produce the random number for the location-based HSM 105.

The GPS module 140 is a component of the location-based HSM 105 configured to determine the location of the location-based HSM 105 based on its GPS coordinates. The GPS module 140 can be in communication with a GPS system to acquire the location information of the location-based HSM 105. In some embodiments, the GPS module 140 provides location data to the encryption module 120 at predetermined intervals (e.g., periodic location pings to the GPS system).

The communication device 150 is a component of the location-based HSM 105 configured to transmit signing request messages to the location authority 160. The communication device 150 is further configured to receive responses back from the location authority 160. The communication device 150 can transmit and receive messages via short distance wired communication (e.g., universal serial bus (USB), serial AT attachment (SATA), Thunderbolt, USB-C) or via a short distance wireless communication (e.g., near-field communication (NFC), Bluetooth, radio frequency identification (RFID), Bluetooth low-energy, QR codes, Wi-Fi, Z-Wave, Li-Fi, Ultrasonic).

The communication device 150 is further configured to digitally sign a transaction for payment or the like via the wired communication or wireless communication using a private key generated from the master seed.

The location authority 160 is a component of the authorization environment 100 configured to authorize signing request messages and respond with signatures. In some embodiments, the location authority 160 is a facility located at a fixed location capable of signing messages based on location. For example, the location authority 160 can be located in a municipal building of a city, town, or at a monument. The location authority 160 can also be assigned an authorization zone. The authorization zone is an area designated to the location authority 160 from which the location authority 160 has the authority to authorize signing requests sent by a location-based HSM 105. For example, the authorization zone may include the area of a city. If the location-based HSM 105 generates a signing request within the authorization zone, the location authority 160 can authorize the signing request. However, if the signing request is not within the authorization zone, then the location authority 160 cannot authorize the signing request.

In some embodiments, multiple location authorities 160 exist within the same authorization zone. Each of the location authorities within an authorization zone can have the same private key for authorizing signing requests. For example, a location authority 160 can be located in every municipal building in a city as well as at predetermined locations around the city.

In some embodiments, the location authority 160 includes a response limiter. The response limiter limits the number of signing requests from a particular hash function within a signing request message. For example, if a signing request message is transmitted to the location authority 160 with the same hash function multiple times, then after a predetermined number of attempts, the response limiter will automatically reject the request. The rejection of the request can be delayed indefinitely or for a predetermined amount of time (e.g., one hour, one day, a week, etc.). The response limiter can be viewed as a countermeasure against brute force attacks transmitting bulk requests.

In some embodiments, the location authority 160 verifies the movement of the location-based HSM 105. The location authority 160 can assess the time and/or the path the location-based HSM 105 performed based on the location data received in the signing request. For example, a time limit corresponding to the distance from the location data to the location authority 160 can be set. If the location-based HSM 105 fails to transmit the signing request within the time limit, the signing request will be rejected. In some embodiments, the location authority 160 can receive location information obtained by the location-based HSM 105 from the time the signing request message was generated to the time the signing request message was transmitted to the location authority 160. The location authority 160 can analyze the location information to determine whether the location-based HSM 105 traveled in an ordinary fashion (e.g., on roadways, train, etc.) or if the location information does not provide an accurate travel path (e.g., straight-line through a mountain, incomplete information, etc.)

In some embodiments, the location authority 160 requires authorization from multiple location authorities 160 within an authorization zone. For example, within an authorization zone, there may be fifteen location authorities 160. Of those fifteen, the location authority 160 may require the location-based HSM 105 to receive authorization from three prior to receiving the signature. In some embodiments, the location authorities 160 are given different authorization levels within an authorization zone. For example, there may be a city-level location authority 160 and a county-level location authority 160. In some embodiments, the location authority 160 requires authorization from location authorities 160 with differing authorization levels. 160. For example, the location authority 160 may require authorization from a city-level location authority 160 and a county-level location authority 160 prior to transmitting the authorizing signature.

It is noted that FIG. 1 is intended to depict the major representative components of an exemplary authorization environment 100. In some embodiments, however, individual components may have greater or less complexity than as represented in FIG. 1, components other than or in addition to those shown in FIG. 1 may be present, and the number, type, and configuration of such components may vary.

Figure 2B:
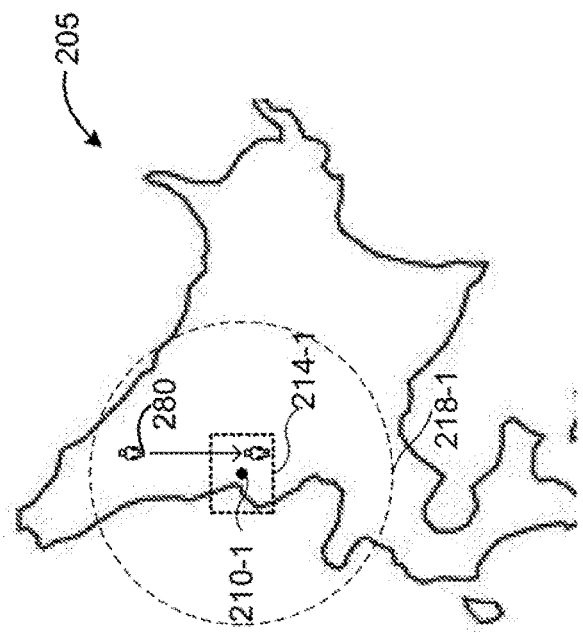
FIGS. 2A and 2B illustrate a map where an exemplary key generation process can occur, in accordance with embodiments of the present disclosure.
Figure 2A:
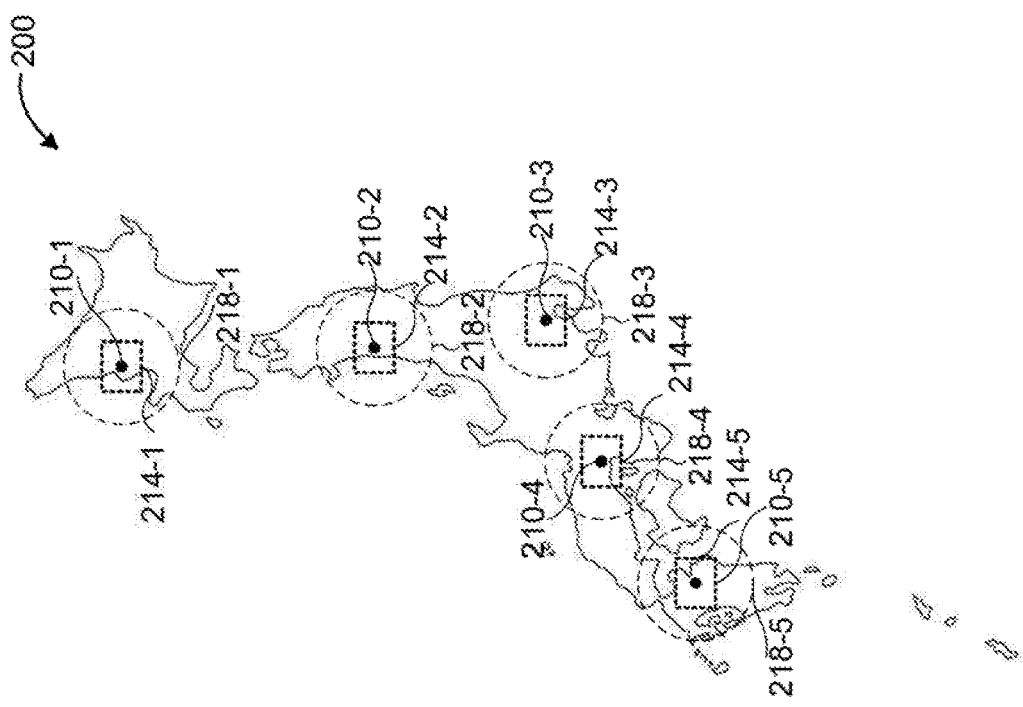

FIGS. 2A and 2B are exemplary maps 200, 205 illustrating authorization regions, in accordance with embodiments of the present disclosure. The exemplary map 200 includes location authorities 210-1, 210-2, 210-3, 210-4, 210-5 (collectively "location authorities 210"). The location authorities 210 may be the same as, or equivalent to, the location authority 160, as illustrated in FIG. 1. Each of the location authorities 210 includes an acceptance region 214-1, 214-2, 214-3, 214-4, 214-5 (collectively "acceptance regions 214") and authorization zones 218-1, 218-2, 218-3, 218-4, 218-5 (collectively "authorization zones 218").

The location authorities 210 can be dispersed throughout a region, territory, country, and the like. Additionally, the location authorities 210 can be located at a fixed location within an authorization zone 218. In some embodiments, multiple location authorities 210 are located within the same authorization zone 218 with each location authority 210 within the same authorization zone 218 being able to authorize based on the authorization zone 218.

The acceptance regions 214 indicate an area in close proximity to the location authorities 210 in which a location-based HSM 105 can transmit a signing request message via wired communication or close-range wireless communication. The location authorities 210 can transmit a response to the signing request back to the location-based HSM 105 based on the location data included in the signing request message.

The authorization zones 218 illustrate an area around the location authorities 210 in which the location authorities 210 are allowed to authorize a signing request message. A signing request message is required to be generated at a location within an authorization zone of a location authority 210 in order for the location authority 210 to authorize the signing request.

FIG. 2B illustrates a map 205 of an exemplary key generation process between a location-based HSM 105 and the location authority 210-1. An entity 280 with a location-based HSM 105 can generate a signing request message at a location within the authorization zone 218-1. Once generated, the entity 280 can travel to within the acceptance region 214-1. At the acceptance region, the location-based HSM 105 can transmit the signing request message with the location data of the original location to the location authority 210-1. The location authority 210-1 can verify the signing request message and location data. If verified, the location authority 210-1 can transmit a signature back to the location-based HSM 105.

Figure 3:
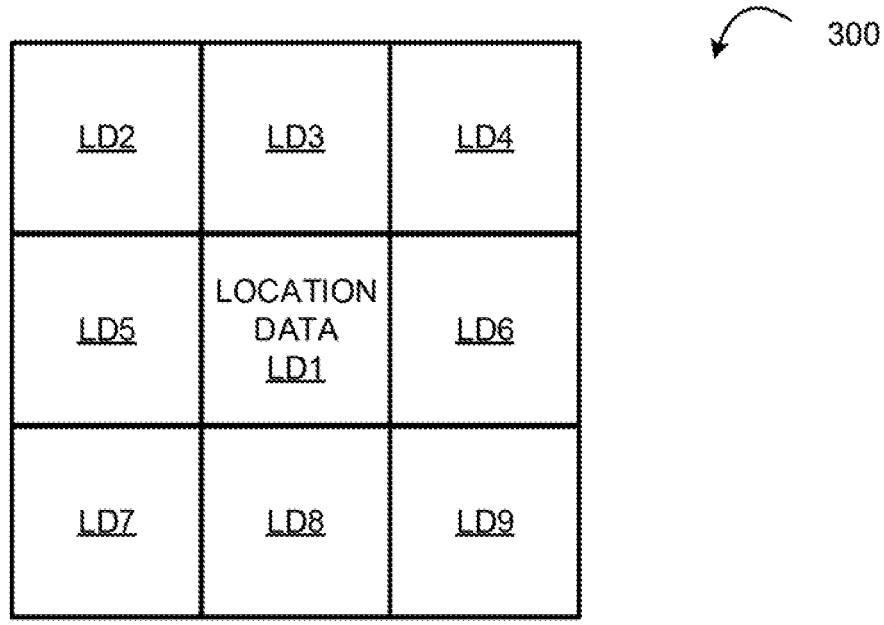
FIG. 3 illustrates an exemplary countermeasure location data configuration, in accordance with embodiments of the present disclosure.

FIG. 3 illustrates an exemplary countermeasure location data configuration 300, in accordance with embodiments of the present disclosure. GPS location data is typically accurate to within approximately 10 meters. As such, if a location data is gathered at particular point, there may be an inaccuracy around the point of 10 meters. To account for the possible inaccuracy, the location-based HSM 105 can implement the countermeasure location data configuration 300 when initially generating a signing request message as well as when creating the master seed.

In some embodiments, in order to regenerate a master seed using the mnemonic sentence, multiple signing request messages may be required. A location-based HSM 105 can initially generate a signing request message at the same location LD1 the original signing request message was generated. The location-based HSM 105 can use that location data LD1 to derive other locations. As illustrated in configuration 300, the location data LD1 can generate LD2, LD3, LD4, LD5, LD6, LD7, LD8, and LD9 by adjusting the longitudinal and latitudinal coordinates of location data LD1.

For example, location data LD2 can be generated by incrementing the longitudinal coordinate by a predetermined amount (e.g., one, two, five, etc.) and by decrementing the latitudinal coordinate by the same predetermined amount. The remaining location data locations LD3-9 can be generated in a similar fashion and included in corresponding signing request messages. In this particular configuration, the location-based HSM 105 would generate nine signing request messages. Each of which would require authorization from a location authority 160 prior to receiving a signature.

Figure 4:
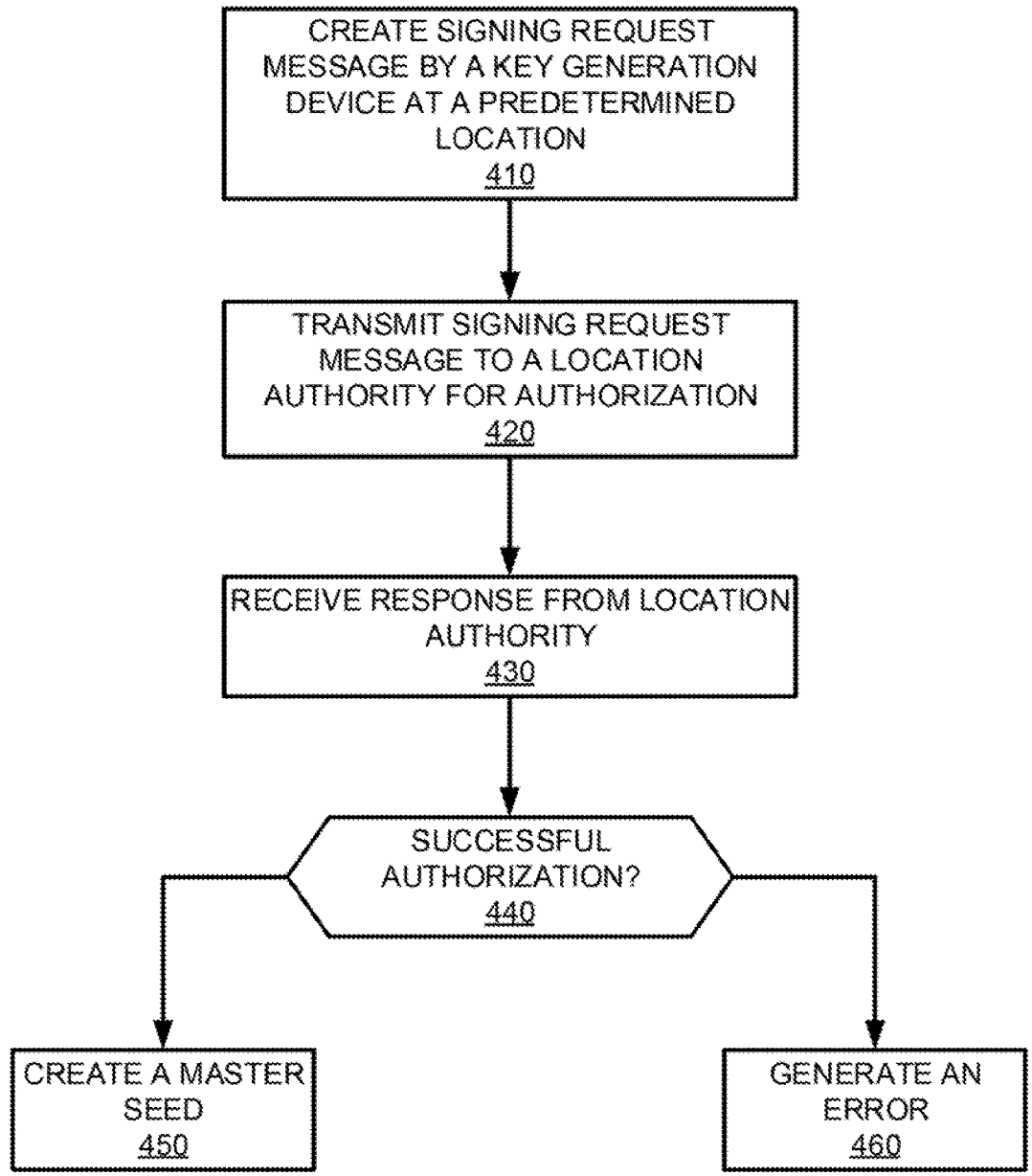
FIG. 4 is a flow diagram illustrating a process of creating a master seed using location data, in accordance with embodiments of the present disclosure.

FIG. 4 is a flow diagram illustrating a process 400 of creating a master seed using a location-based HSM, in accordance with embodiments of the present disclosure. The process 400 can be implemented by, for example, one or more entities in the authorization environment 100, a computer system 800, a processor, or another configuration of hardware and/or software.

The process 400 begins by the location-based HSM 105 creating a signing request message. This is illustrated at step 410. The encryption module 120 can generate a signing request using the secure hash algorithm 2. In some embodiments, the encryption module 120 generates the signing request by applying the SHA-256 function using a random number generated by the PRNG 130 and the location data detected by the GPS module 140.

The communication device 150 transmits the signing request message to the location authority 160. This is illustrated at step 420. The communication device 150 can transmit the signing request message via short distance wired communication or via a short distance wireless communication depending on the configuration of the location-based HSM 105. For example, the location-based HSM 105 may plug into a USB slot of the location authority 160 to transmit the signing request message. In some embodiments, the location-based HSM 105 transmits the signing request message to the location authority 160 via short-distance communication such as NFC or Bluetooth.

The communication device 150 receives a response back from the location authority 160. This is illustrated at step 430. The response back from the location authority 160 can be received in the same way, or in a similar fashion, as the transmission of the signing request message. For example, if the signing request message was transmitted via NFC, the response back will be received via NFC. In some embodiments, however, the location authority 160 may be configured to only transmit a response back in one way. For instance, the location authority 160 may only send responses back via Bluetooth regardless of how the signing request message is received from the location-based HSM 105.

The location-based HSM 105 determines whether the response contains a signature or an error response. This is illustrated at step 440. Upon determining that the response included a signature, the encryption module 120 can generate a master seed. This is illustrated at step 450. In some embodiments, the encryption module 120 creates the master seed using a key derivation function using the mnemonic sentence as a password and a SHA-2 hash algorithm of the signature as a salt variable. Including the master seed, the encryption module 120 can generate a checksum and a mnemonic sentence that can be used to regenerate the master seed. However, if the response included an error message, the location-based HSM 105 can display the error message. This is illustrated at step 460. The location-based HSM 105 can display the error message via a display located on the location-based HSM 105, via an indicator light, via a noise indicating an error, or through some other means.

Figure 5:
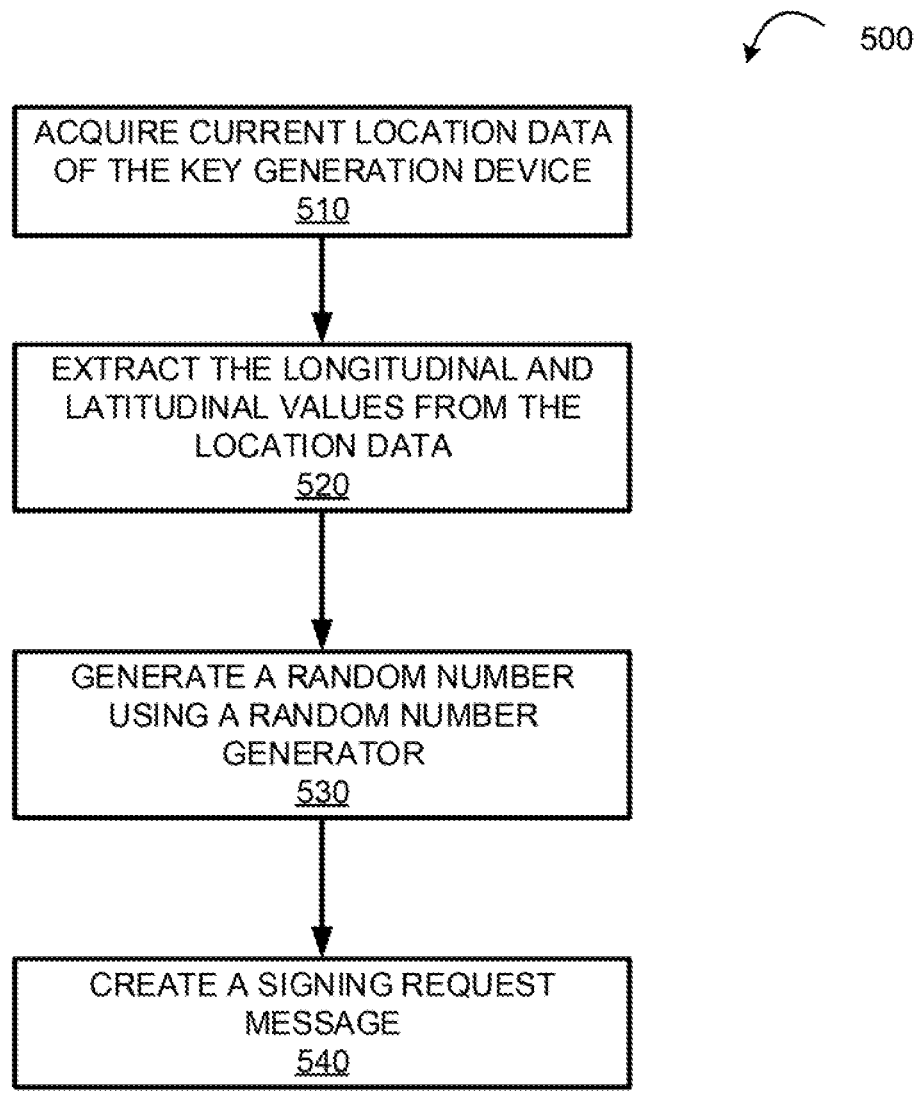
FIG. 5 is a flow diagram illustrating a process of creating a signing request message, in accordance with embodiments of the present disclosure.

FIG. 5 is a flow diagram illustrating a process 500 of creating a signing request message, in accordance with embodiments of the present disclosure. The process 500 can be implemented by, for example, one or more entities in the authorization environment 100, a computer system 800, a processor, or another configuration of hardware and/or software. In some embodiments, the process 500 is a sub-process of step 410 of FIG. 4.

The process 500 begins by the GPS module 140 acquiring the location data of the location-based HSM 105. This is illustrated at step 510. The location data is a current GPS coordinate of the location-based HSM 105 at the time the signing request message generation process 500 begins. The GPS module 140 extracts the longitudinal and latitudinal coordinates from the location data. This is illustrated at step 520. The extracted longitudinal and latitudinal coordinate values can be rounded off to four decimals. For example, if longitudinal and the latitudinal coordinates are 35.658581° N, 139.745438° E, then the resulting values would be 35.6585 and 139.7454.

The PRNG 130 generates a random number. This is illustrated at step 530. The PRNG 130 can run a deterministic random bit generator algorithm that expands some bits from the entropy pool into a longer sequence to produce the random number for the location-based HSM 105. In some embodiments, the PRNG 130 using the current time as entropy for the generation of the random number. For example, the current time can be taken to add to an entropy pool from which the PRNG 130 generates the random number.

The encryption module 120 creates a signing request message. This is illustrated at step 540. The encryption module 120 can generate the signing request by applying a SHA-256 function using the random number generated by the PRNG 130 and adding the longitudinal and latitudinal coordinates extracted by the GPS module 140.

Figure 6:
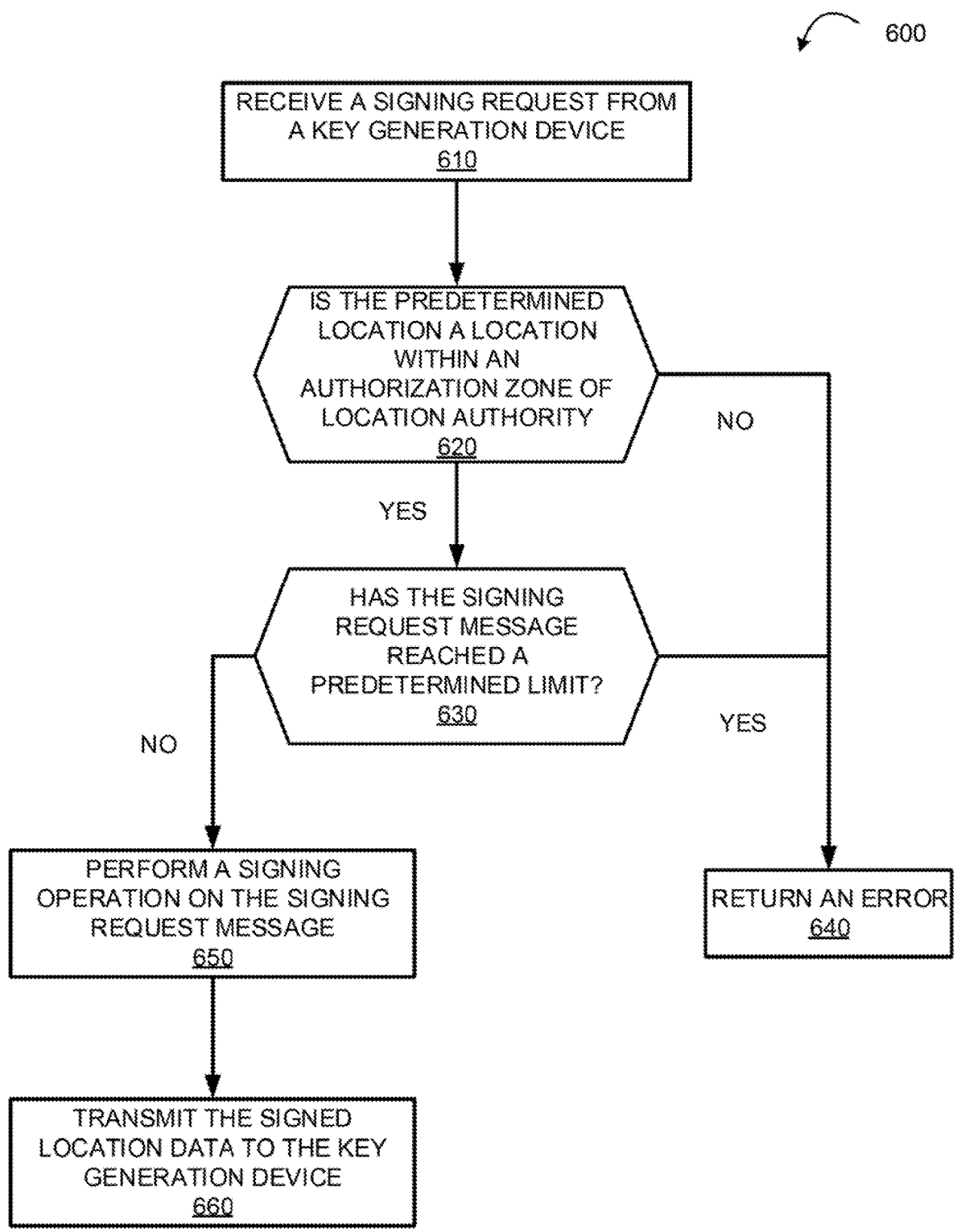
FIG. 6 is a flow diagram illustrating a process of authorizing a signing request message, in accordance with embodiments of the present disclosure.

FIG. 6 is a flow diagram illustrating a process 600 of authorizing a signing request message, in accordance with embodiments of the present disclosure. The process 600 can be implemented by, for example, one or more entities in the authorization environment 100, a computer system 900, a processor, or another configuration of hardware and/or software.

The process 600 begins by receiving a signing request message from a location-based HSM 105. This is illustrated at step 610. The location authority 160 can receive a signing request message via short distance wired communication or via a short distance wireless communication depending on the configuration of the location-based HSM 105 and the location authority 160. For example, the location-based HSM 105 may plug into a USB slot of the location authority 160 to transmit the signing request message. In some embodiments, the location authority 160 receives the signing request message from the location-based HSM 105 via short-distance communication such as NFC or Bluetooth.

The location authority 160 determines whether the location data attached to the signing request represents a location within an authorization zone of the location authority 105. This is illustrated at step 620. For example, the authorization zone may be a twenty-mile radius around location authority 160. If the location data attached to the signing request message is a location within the twenty-mile radius, then the location authority 160 can proceed to step 630. However, if the location data is not within the authorization zone assigned to the location authority 160, then the location authority 160 transmits an error response back to the location-based HSM 105. This is illustrated at step 640.

The location authority 160 verifies that the location-based HSM 105 has not reached a predetermined limit in signing request messages. This is illustrated at step 630. For example, if a signing request message is transmitted to the location authority 160 with the same hash function multiple times, then after a predetermined number of attempts (e.g., once per hour, day, week, month), the response limiter will automatically reject the request. The rejection of the request can be delayed indefinitely or for a predetermined amount of time (e.g., one hour, one day, a week, etc.). If the location authority 160 determines that the location-based HSM 105 has reached its predetermined limit, then the location authority transmits an error response back to the location-based HSM 105. However, if the location-based HSM has not reached its limit, then the process 600 can proceed to step 650.

The location authority 160 performs a signing operation on the signing request message. This is illustrated at step 650. In some embodiments, the location authority 160 generates a digital signature. A digital signature is a mathematical scheme for verifying the authenticity of digital messages or documents. Once completed, the location authority 160 transmits the digital signature back to the location-based HSM 105. This is illustrated at step 660.

Figure 7:
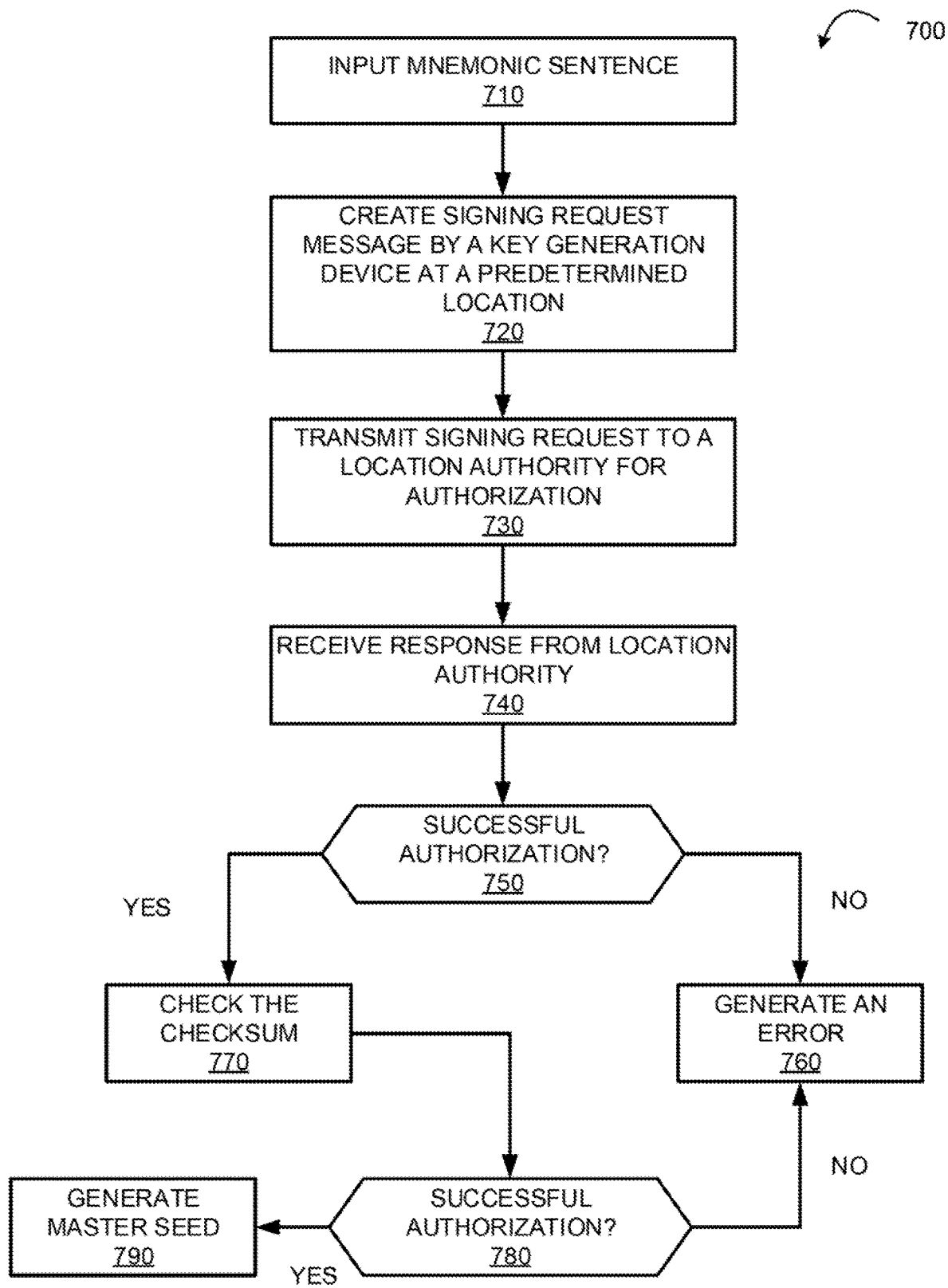
FIG. 7 is a flow diagram illustrating a process of recreating a master seed, in accordance with embodiments of the present disclosure.

FIG. 7 is a flow diagram illustrating a process 700 of recreating a master seed, in accordance with embodiments of the present disclosure. The process 700 can be implemented by, for example, one or more entities in the authorization environment 100, a computer system 800, a processor, or another configuration of hardware and/or software.

The process 700 begins by receiving the mnemonic sentence originally generated from the random number and the signature checksum. This is illustrated at step 710. The location-based HSM 105 creates a signing request message at the same location as the previous signing request message. This is illustrated at step 720. The encryption module 120 can generate a signing request using the secure hash algorithm 2. In some embodiments, the encryption module 120 generates the signing request by applying the SHA-256 function using a random number, separate from the mnemonic sentence, and the location data detected by the GPS module 140.

The communication device 150 transmits the signing request message to the location authority 160. This is illustrated at step 730. The communication device 150 can transmit the signing request message via short distance wired communication or via a short distance wireless communication depending on the configuration of the location-based HSM 105. For example, the location-based HSM 105 may plug into a USB slot of the location authority 160 to transmit the signing request message. In some embodiments, the location-based HSM 105 transmits the signing request message to the location authority 160 via short-distance communication such as NFC or Bluetooth.

The communication device 150 receives a response back from the location authority 160. This is illustrated at step 740. The response back from the location authority 160 can be received in the same way, or in a similar fashion, as the transmission of the signing request message. For example, if the signing request message was transmitted via NFC, the response back will be received via NFC. In some embodiments, however, the location authority 160 may be configured to only transmit a response back in one way. For instance, the location authority 160 may only send responses back via Bluetooth regardless of how the signing request message is received from the location-based HSM 105.

The location-based HSM 105 determines whether the response contains a signature or an error response. This is illustrated at step 750. Upon determining that the response included a signature, the process 700 can proceed to step 770. However, if the response included an error message, the location-based HSM 105 can display the error message. This is illustrated at step 760. The location-based HSM 105 can display the error message via a display located on the location-based HSM 105, via an indicator light, via a noise indicating an error, or through some other means.

The location-based HSM 105 compares the checksum, that is separate from the mnemonic sentence, against the signature received by the location authority 160. This is illustrated at step 770. The new checksum can be generated by applying a SHA-2 function to the signature. The first 8-bits of that function can represent the checksum. The location-based HSM 105 determines whether the checksums match. This is illustrated at step 780. If the checksum does not match the new checksum, then the location-based HSM 105 displays an error.

If the checksums match, the encryption module generates the master seed. This is illustrated at step 790. In some embodiments, the encryption module 120 creates the master seed using a key derivation function using the mnemonic sentence as a password and a SHA-2 hash on the signature as a salt variable.

Figure 8:
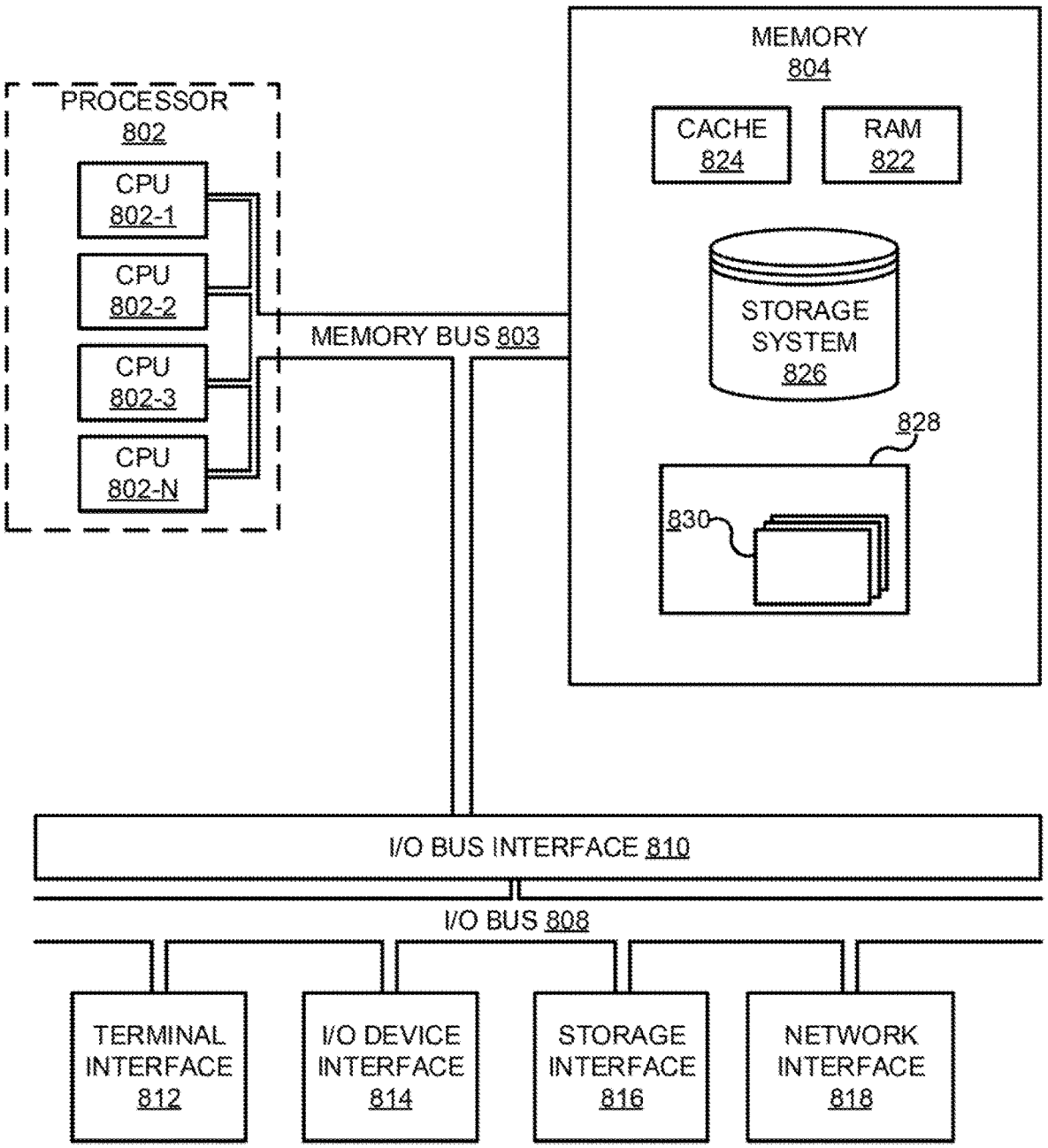
FIG. 8 is a high-level block diagram illustrating an example computer system that may be used in implementing one or more of the methods, tools, and modules, and any related functions, described herein, in accordance with embodiments of the present disclosure.

Referring now to FIG. 8, shown is a high-level block diagram of an example computer system 800 (e.g., the authorization environment 100, the location-based HSM 105) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 800 may comprise one or more processors 802, a memory 804, a terminal interface 812, an I/O (Input/Output) device interface 814, a storage interface 816, and a network interface 818, all of which may be communicatively coupled, directly or indirectly, for inter-component communication via a memory bus 803, an I/O bus 808, and an I/O bus interface 810.

The computer system 800 may contain one or more general-purpose programmable central processing units (CPUs) 802-1, 802-2, 802-3, and 802-N, herein generically referred to as the processor 802. In some embodiments, the computer system 800 may contain multiple processors typical of a relatively large system; however, in other embodiments, the computer system 800 may alternatively be a single CPU system. Each processor 801 may execute instructions stored in the memory 804 and may include one or more levels of onboard cache.

The memory 804 may include computer system readable media in the form of volatile memory, such as random-access memory (RAM) 822 or cache memory 824. Computer system 800 may further include other removable/non-removable, volatile/non-volatile computer system storage media. By way of example only, storage system 826 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, the memory 804 can include flash memory, e.g., a flash memory stick drive or a flash drive. Memory devices can be connected to memory bus 803 by one or more data media interfaces. The memory 804 may include at least one program product having a set (e.g., at least one) of program modules that are configured to carry out the functions of various embodiments.

Although the memory bus 803 is shown in FIG. 8 as a single bus structure providing a direct communication path among the processors 802, the memory 804, and the I/O bus interface 810, the memory bus 803 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 810 and the I/O bus 808 are shown as single respective units, the computer system 800 may, in some embodiments, contain multiple I/O bus interface units, multiple I/O buses, or both. Further, while multiple I/O interface units are shown, which separate the I/O bus 808 from various communications paths running to the various I/O devices, in other embodiments some or all of the I/O devices may be connected directly to one or more system I/O buses.

In some embodiments, the computer system 800 may be a multi-user mainframe computer system, a single-user system, or a server computer or similar device that has little or no direct user interface but receives requests from other computer systems (clients). Further, in some embodiments, the computer system 800 may be implemented as a desktop computer, portable computer, laptop or notebook computer, tablet computer, pocket computer, telephone, smartphone, network switches or routers, or any other appropriate type of electronic device.

It is noted that FIG. 8 is intended to depict the major representative components of an exemplary computer system 800. In some embodiments, however, individual components may have greater or lesser complexity than as represented in FIG. 8, components other than or in addition to those shown in FIG. 8 may be present, and the number, type, and configuration of such components may vary.

One or more programs/utilities 828, each having at least one set of program modules 830 (e.g., the authorization environment 100, the location-based HSM 105), may be stored in memory 804. The programs/utilities 828 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 828 and/or program modules 830 generally perform the functions or methodologies of various embodiments.

The present invention may be a system, a method, and/or a computer program product at any possible technical detail level of integration. The computer program product may include a computer-readable storage medium (or media) having computer readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But the various embodiments may be practiced without these specific details. In other instances, well-known circuits, structures, and techniques have not been shown in detail in order not to obscure embodiments.

When different reference numbers comprise a common number followed by differing letters (e.g., 100a, 100b, 100c) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A computer-implemented method of creating a master seed using location data, the computer-implemented method comprising:

creating a signing request message using a location-based hardware security module (HSM) located at a location using a random number generator that generates a random number using a current time of the location-based HSM;

transmitting the signing request message to a location authority with coordinates of the location attached;

receiving a response from the location authority authorizing the signing request message based on the coordinates and providing a signature; and creating a master seed based on the signature.

2. The computer-implemented method of claim 1, wherein creating the signing request message comprises:

acquiring location data of the location-based HSM;

determining the location data is located at a predetermined location, wherein the predetermined location is an undisclosed location known only by an operator of the location-based HSM;

extracting longitudinal and latitudinal values from the location data;

generating the random number using the random number generator; and creating the signing request message using the random number and attaching the longitudinal and latitudinal values.

3. The computer-implemented method of claim 1, further comprising:

receiving a recovery mnemonic sentence to regenerate a second master seed;

creating signing request messages using the location-based HSM at the location;

transmitting the signing request messages to the location authority with the coordinates of the location attached;

receiving a second response from the location authority authorizing the signing request messages and providing a second signature;

verifying a checksum derived from the mnemonic sentence with a second checksum derived from the second signature; and creating a second master seed based on the mnemonic sentence and the second signature and the verification of the checksum.

4. The computer-implemented method of claim 3, wherein the signing request messages include location data around the location.

5. The computer-implemented method of claim 1, wherein the location is within an authorization zone of the location authority.

6. The computer-implemented method of claim 1, wherein the location authority is physically located at a geographically assured location.

7. A computer program product of creating a master seed using location data, the computer program product comprising:

one or more computer readable storage medium, and program instructions stored on the one or more computer readable storage media, the program instructions comprising:

program instructions to create a signing request message using a location-based hardware security module (HSM) located at a location using a random number generator that generates a random number using a current time of the location-based HSM;

program instructions to transmit the signing request message to a location authority with coordinates of the location attached;

program instructions to receive a response from the location authority authorizing the signing request message based on the coordinates and providing a signature; and program instructions to create a master seed based on the signature.

8. The computer program product of claim 7, wherein the program instructions to create the signing request message comprise:

program instructions to acquire location data of the location-based HSM;

program instructions to determine the location data is located at a predetermined location, wherein the predetermined location is an undisclosed location known only by an operator of the location-based HSM;

program instructions to extract longitudinal and latitudinal values from the location data;

program instructions to generate the random number using the random number generator; and program instructions to create the signing request message using the random number and attaching the longitudinal and latitudinal values.

9. The computer program product of claim 7, further comprising:

program instructions to receive a recovery mnemonic sentence to regenerate a second master seed;

program instructions to generate signing request messages using the location-based HSM at the location;

program instructions to transmit the signing request messages to the location authority with the coordinates of the predetermined location attached;

program instructions to receive a second response from the location authority authorizing the signing request messages and providing a second signature;

program instructions to verify a checksum derived from the mnemonic sentence with a second checksum derived from the second signature; and program instructions to create a second master seed based on the mnemonic sentence and the second signature and the verification of the checksum.

10. The computer program product of claim 9, wherein the signing request messages include location data around the location.

11. The computer program product of claim 7, wherein the location is within an authorization zone of the location authority.

12. The computer program product of claim 7, wherein the location authority is physically located at a geographically assured location.

13. A location-based hardware security module (HSM) for generating a master seed using location data, the location-based HSM comprising:

a pseudo-random number generator (PRNG) configured to generate a random number wherein the PRNG generates the random number using a current time as entropy;

a global positioning system (GPS) module configured to determine a location of the location-based HSM;

an encryption module configured to generate a signing request message, wherein the signing request message includes the random number and the location;

a communication device configured to transmit the signing request message to a location authority for authorization, the communication device further configured to receive a signature from the location authority upon authorization of the signing request message; and wherein the encryption module is further configured to generate a master seed based on the signature.

14. The location-based HSM of claim 13, where the location is a longitudinal and latitudinal coordinate of the location-based HSM that is within an authorization zone of the location authority.

15. The location-based HSM of claim 13, wherein the encryption module is further configured to recreate the master seed based on a mnemonic sentence.

16. The location-based HSM of claim 13, wherein the communication device is further configured to transmit the signing request message to multiple location authorities in order to receive the signature.

17. The location-based HSM of claim 13, wherein the location authority is a facility located at a fixed location.

* * * * *